June 7, 1938.  C. E. PHILLIPS  2,120,040
AGRICULTURAL MACHINE
Filed June 13, 1936   3 Sheets-Sheet 1

Inventor
Charles E. Phillips
By CASnow&Co.
Attorneys.

June 7, 1938.  C. E. PHILLIPS  2,120,040
AGRICULTURAL MACHINE
Filed June 13, 1936   3 Sheets-Sheet 2
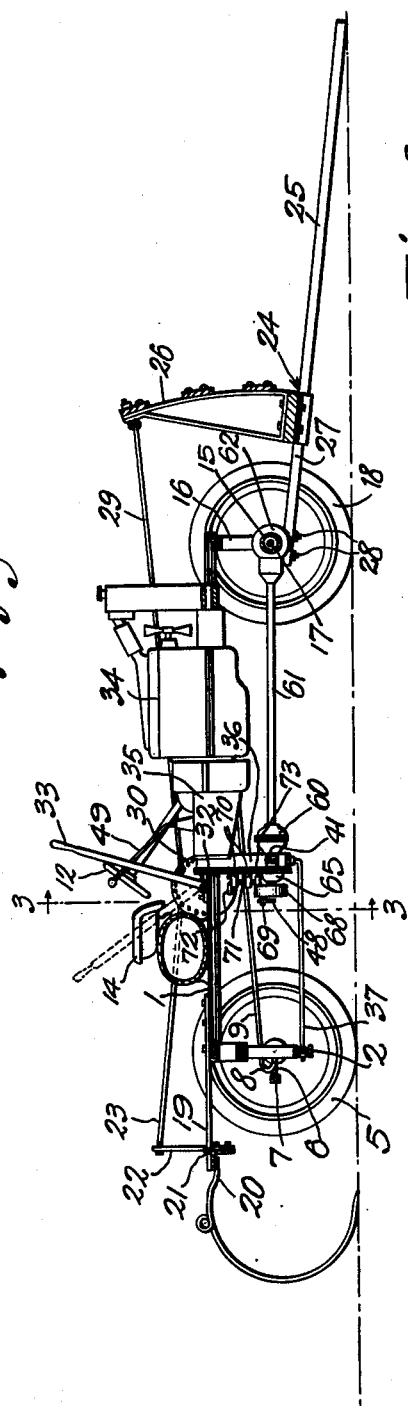
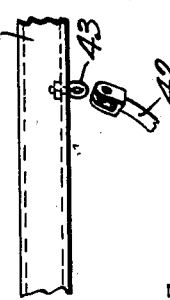
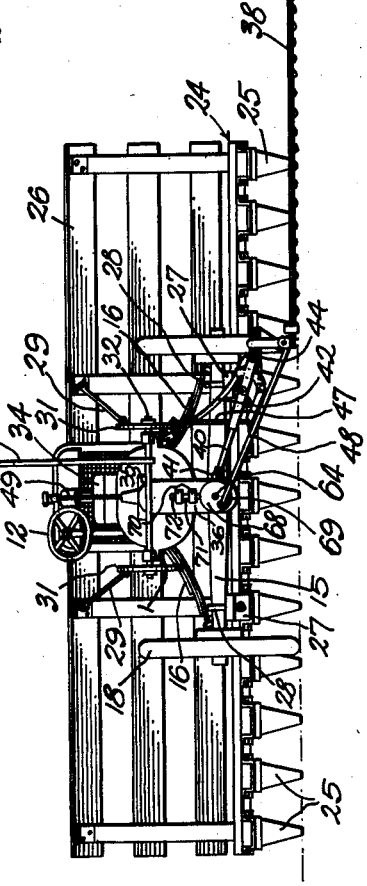
Inventor
Charles E. Phillips
By C. A. Snow & Co.
Attorneys.

June 7, 1938. C. E. PHILLIPS 2,120,040
AGRICULTURAL MACHINE
Filed June 13, 1936 3 Sheets-Sheet 3
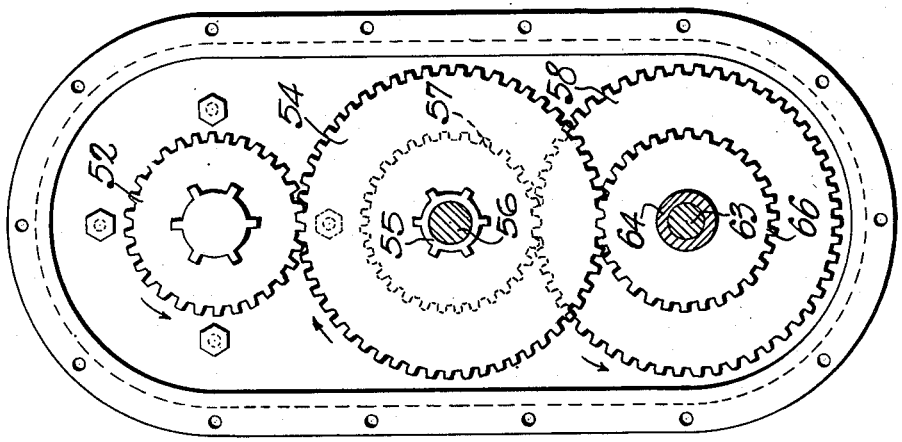
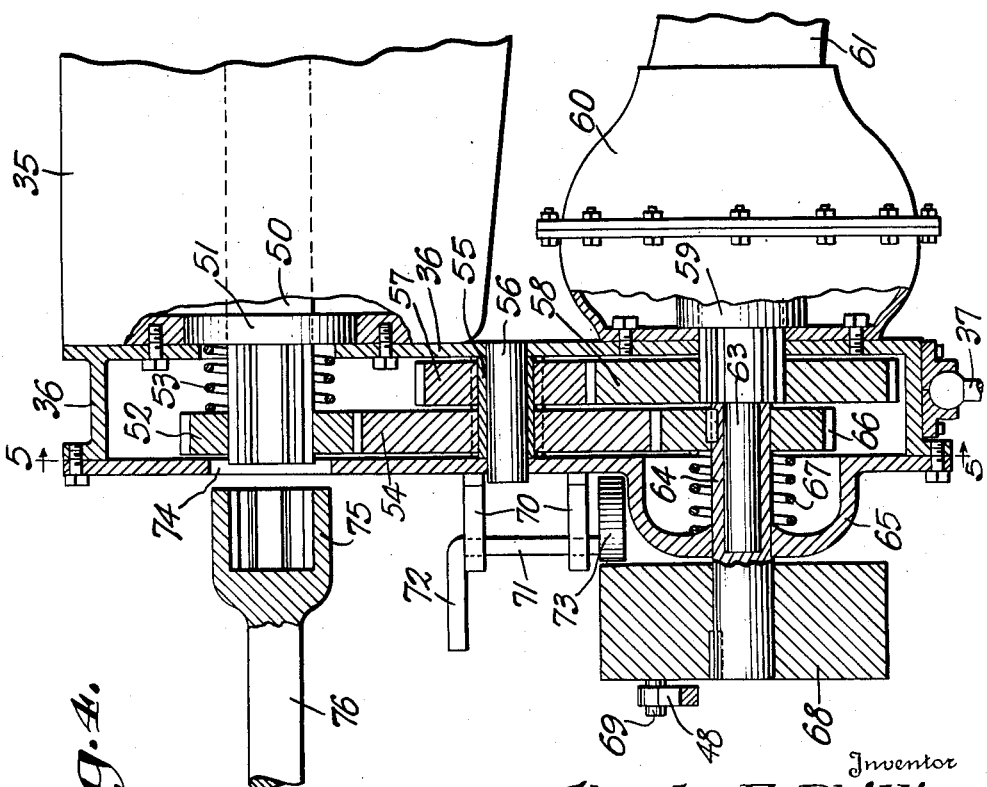
Inventor
Charles E. Phillips
By CA Snow & Co.
Attorneys.

Patented June 7, 1938

2,120,040

UNITED STATES PATENT OFFICE 2,120,040

AGRICULTURAL MACHINE

Charles Edward Phillips, Logan, W. Va.

Application June 13, 1936, Serial No. 85,148

5 Claims. (Cl. 74—389)

One object of the present invention is to provide a motor propelled vehicle, to which a gathering rake, a pick-up rake, a mowing mechanism or a device for driving a rotating tool, may be connected readily. Another object of the invention is to supply novel means for raising and lowering the rakes at the will of an operator.

Another object of the invention is to provide novel means for driving the vehicle from the front wheels and steering the vehicle from the rear wheels. The invention aims to supply novel mechanism for transmitting movement from the engine of the vehicle to the front or driving wheels of the vehicle and to a mower, it being possible to operate the vehicle without operating the mowing mechanism, if the person in control of the vehicle wishes to do so.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 2 is a longitudinal section;

Fig. 3 is a section on the line 3—3;

Fig. 4 is a vertical sectional view illustrating part of the driving means;

Fig. 5 is a section on the line 5—5 of Fig. 4;

Fig. 6 is a plan illustrating the auxiliary driving shaft;

Fig. 7 is an elevation showing a part of the means for mounting the mowing mechanism.

Figure 1:
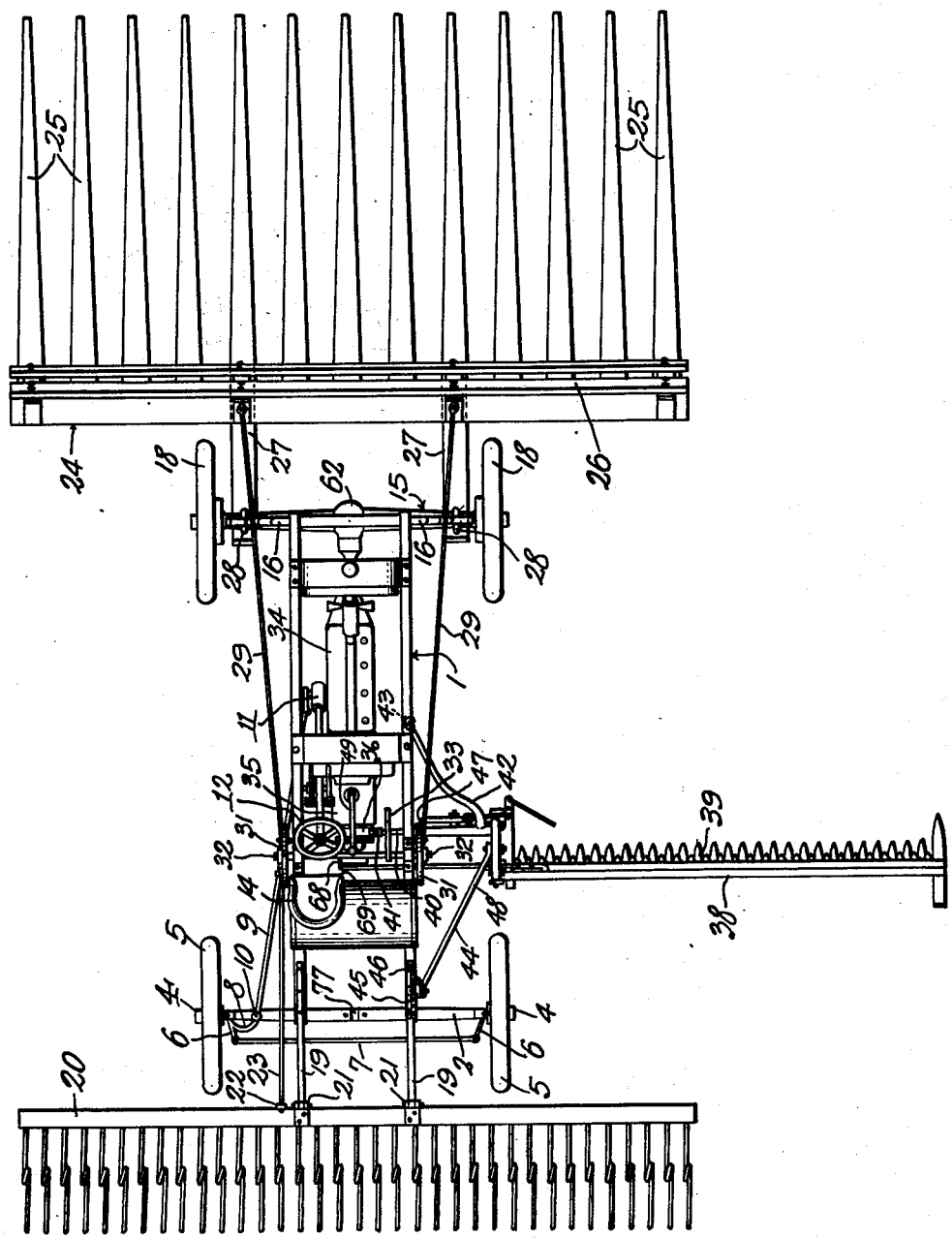
Fig. 1 shows in top plan, a device constructed in accordance with the invention.

In carrying out the invention there is provided a vehicle, which may be an automobile, the frame 1 of which is turned end for end with respect to the engine 34, so as to have a front drive, and to effect the steering from the rear.

A rear axle 2 is secured by springs 3, or otherwise, to the rear part of the frame 1, and has pivotally mounted, horizontal movable ends 4 whereon the rear wheels 5 are journaled. The axle ends 4 are supplied with rearwardly extended arms 6, to which the extremities of a drag link 7 are pivotally connected. One of the arms 6 has a forwardly extended offset 8 to which a controlling rod 9 is joined by a ball and socket joint 10. The forward end of the controlling rod 9 is operatively connected to a steering mechanism 11 on the frame 1, the steering mechanism comprising a hand wheel 12 located accessibly with respect to a driver's seat 14 on the frame 1.

A front axle housing 15 is connected by springs 16, or otherwise, to the forward portion of the frame 1. A front axle 17 is journaled in the front axle housing 15. Forward ground wheels 18 are secured to the front axle 17.

Rearwardly extended brackets 19 are attached to the back part of the frame 1. A gathering rake 20, having curved tines, is hinged at 21 to the rear ends of the brackets 19, for vertical swinging adjustment. The rake 20 is provided with an upstanding post 22 to which is attached the rear end of a cable 23, or the like.

The numeral 24 marks a pickup rake disposed at the front of the vehicle, the pickup rake comprising teeth 25. The pickup rake 24 has an upstanding back 26. Certain of the teeth 25 are prolonged rearwardly, to form arms 27, connected by the U-bolts 28 or the like, to the forward axle housing 15, a detachable connection thus being afforded, and it being possible to swing the pickup rake 24 upwardly and downwardly. Cables 29 or the like are attached at their forward ends to the back portion 26 of the pickup rake 24, and the rear ends of these cables are mounted detachably for adjustment in openings 30 in disks 31, secured to a transverse shaft 32 journaled for rocking movement on the frame 1. At this point it may be noted that the cable 23 which controls the vertical swinging adjustment of the gathering rake 20, is likewise connected detachably to one of the disks 31. The transverse shaft 32 is provided with an upstanding handle 33, accessible from the driver's seat 14.

An internal combustion engine 34 is mounted on the frame 1. The transmission casing is shown at 35. A supplemental, downwardly extended casing 36 is attached to the rear end of the transmission casing 35, and is sustained from the rear axle 2 by means of a brace 37.

The mowing mechanism may be of any desired construction and, therefore, the description of the mowing mechanism may be shortened accordingly. It comprises a support 38, on which a cutter bar 39 is mounted for reciprocation. A connection 40 is joined at its outer end to the support 38 for the cutter bar 39, and is detachably joined, as shown at 41, to one side of the supplemental casing 36. A brace 42 is joined to the connection 40, intermediate the ends of the connection. The brace 42 extends upwardly and forwardly, and is joined detachably to an eye 43 (Fig. 7) on the frame 1. The support 38 and the cutter bar 39 may be tilted up and down with respect to a transverse axis, that is, tilted from front to back, by means of a link 44, joined at its forward end to the support 38 for the cutter bar 39, and usually joined at its rear end to a lever 45, fulcrumed on the frame 1, and adapted to cooperate with a segment 46 on the frame 1. The support 38 and the cutter bar 39 may be swung upwardly and downwardly by the usual mechanism, embodying a connection 47 joined to one of the disks 31 on the transverse shaft 32. The cutter bar 39 is reciprocated on the support 38, by means of a pitman 48. The general means for mounting and adjusting the position of the cutter bar in a mowing machine is well known, and need not be elaborated upon.

The shift lever for the transmission mechanism is marked by the numeral 49. The transmission mechanism comprises an engine driven shaft 50, shown in Fig. 1 and having an abutment 51. A pinion 52 is splined to the rear end of the shaft 50, and a compression spring is interposed between the abutment 51 and the pinion 52, to hold the pinion 52 in the position shown in Fig. 4, the spring being marked by the numeral 53.

The pinion 52 meshes with a gear wheel 54 secured to a tubular shaft 55 journaled on a stub shaft 56 mounted in the supplemental casing 36. The tubular shaft 55 has secured thereto a pinion 57 meshing with a gear wheel 58 carried by a part 59 of a shaft located in a universal joint casing 60, connected to the depending casing 36. The shaft 59 extends through a torque tube 61, and the torque tube 61 leads to the usual differential mechanism 62, interposed in the front axle housing 15 and in the front axle 17.

The shaft 59 which carries the gear wheel 58 has a reduced end 63 on which slides for adjustment, a tubular shaft 64, the tubular shaft 64 being slidable in an offset 65 on the supplemental casing 36. A pinion 66 is keyed to the tubular shaft 64 and meshes with the gear wheel 54. A compression spring 67 surrounds the tubular shaft 64. The forward end of the spring 67 abuts against the pinion 66, and the rear end of the spring 67 abuts against the offset 65 of the supplemental casing 36. A fly wheel 68 is secured to the rear end of the tubular shaft 64, the pitman 48 that actuates the cutter bar 39 being pivoted at 69 to the fly wheel. There are rearwardly extended bearings 70 on the supplemental casing 36, and in these bearings 70, a vertical shaft 71 is journaled. The shaft 71 has a handle 72 at its upper end. On the lower end of the shaft 71 there is an eccentric 73, which cooperates with the fly wheel 68, at the will of an operator.

There is an opening 74 in the rear wall of the supplemental casing 36, as shown in Fig. 4. This opening 74 is adapted to receive a socket 75 on the forward end of a driving shaft 76. The socket 75 is adapted to engage the rear end of the shaft 50. The driving shaft 76 is removable, but is journaled in a bearing 77 on the rear end of the frame 1. On its rear end, the shaft 76 has any suitable means 78 for retaining on the shaft, a grindstone, a buzz saw or any other implement which the operator may wish to rotate.

Since the pickup rake 24 is detachably connected to the front axle housing 15 by the U-bolts 26, the pickup rake may be removed. The detachable connections shown at 42—43 in Fig. 7 and at 41 in Fig. 3 enable the operator to remove the mowing mechanism if he wishes to do so. The gathering rake 20 then may be operated, it being possible to raise and lower the rake 20 by means of the post 22 on the rake, the cable 23, the disk 31 to which the cable 23 is attached, the transverse shaft 32 and the handle 33. The rake 20 is employed to gather hay or any other crop into windrows.

The gathering rake 20 may be raised to inoperative position, and the pickup rake 25 may be mounted on the front axle housing 15 by means of the U-bolts 26. Then the machine may be run lengthwise of the windrows, the pickup rake 24 gathering up the crop, and carrying it to the place of deposit. The pickup rake 24 is operated by a train of parts comprising the cables 29, the disks 31, the transverse shaft 32 and the handle 33.

The pickup rake 24 may be removed, the gathering rake 20 may be raised to inoperative position, the mowing mechanism 38—39 etc. may be mounted in place, and the machine then may be used for mowing.

Since the operation of the moving mechanism depends upon the operation of the mechanism for advancing the vehicle, the vehicle drive now will be traced out.

The engine 34, operating through the transmission mechanism 35, rotates the shaft 50 and turns the pinion 52, rotation being imparted to the gear wheel 54, the tubular shaft 55, the pinion 57, the pinion 58, the shaft 59, the differential mechanism 62, the front axle 17 and the forward ground wheels 18.

When the pinion 54 is rotated, rotation is imparted to the pinion 66 and to the tubular shaft 64, the fly wheel 68 being operated, and reciprocation being imparted to the cutter bar 39 by way of the pitman 48.

There are times when it will be desirable to operate the machine as a vehicle, without reciprocating the cutter bar 39. Under such circumstances, the shaft 71 of Fig. 4 is rotated by means of the handle 72, and the eccentric 73, engaging the fly wheel 68, moves the fly wheel and the tubular shaft 64 to the left in Fig. 4, the pinion 66 being pulled out of mesh with the gear wheel 54, the pinion 66 entering the offset 65 of the supplemental casing 36. The vehicle then can be driven without reciprocating the cutter bar 39. In order to return the pinion 66 to mesh with the gear wheel 54, the shaft 71 and the eccentric 73 are restored to the position of Fig. 4, the spring 67 carrying the pinion 66 back into mesh with the gear wheel 54.

It may be desirable to rotate the shaft 76 of Fig. 6 without moving the vehicle or reciprocating the cutter bar 39. The shaft 76 is assembled with the rear end portion of the frame 1, for rotation, by means of the bearing 77 of Fig. 6. The shaft 76 is moved to the right in Fig. 4, the socket 75 on the shaft 76 enters the opening 74 in the supplemental casing 36, and the end of the shaft 50 is received in the socket 75, the shaft 76 being coupled to the shaft 50, so that when the shaft 50 is rotated by the engine 34, through the transmission mechanism 35, the shaft 76 will be rotated also. The socket 75 slides the pinion 52 to the right in Fig. 4, out of mesh with the gear wheel 54, and, consequently, there is no driving connection between the shaft 50 and the tubular shaft 64 or the shaft 59. When the shaft 76 is rotated, to turn any tool held on the shaft by the device shown at 78 in Fig. 6, the vehicle will not be advanced nor will the cutter bar 39 be reciprocated.

Broadly stated, the vehicle may be constructed by reversing an automobile end for end with respect to the engine 34. The vehicle is so constituted that a variety of operations incident to farming may be carried out readily by means of a single vehicle.

Having thus described the invention, what is claimed is:

1. Power transmitting mechanism comprising a casing, a driven shaft extended into the casing, a second shaft journaled in the casing and comprising a first part held against longitudinal movement and a second part having longitudinal movement, means for driving machinery from each part of the second shaft, an intermediate gear wheel and an intermediate pinion connected for rotation together, and journaled in the casing, a driven pinion on the second part of the second shaft and meshing with the intermediate gear wheel, a gear wheel on the first part of the second shaft and meshing with the intermediate pinion, a pinion on the driven shaft and meshing with the intermediate gear wheel, and means under the control of an operator for moving the second part of the second shaft longitudinally, to disengage the driven pinion from the intermediate gear wheel.

2. A device of the class described constructed as set forth in claim 1, in combination with spring means for restoring the driven pinion to mesh with the intermediate gear wheel, when the means for moving the second part of the second shaft longitudinally is moved to inoperative position.

3. Power transmitting mechanism comprising a casing, a driven shaft extended into the casing, a second shaft journaled in the casing and comprising a first part held against longitudinal movement and a second part having longitudinal movement, means for driving machinery from each part of the second shaft, the means for driving machinery from the second part of the second shaft comprising a power-transmitting wheel on the second part of the second shaft, an intermediate gear wheel and an intermediate pinion connected for rotation together and journaled in the casing, a driven pinion on the second part of the second shaft and meshing with the intermediate gear wheel, a gear wheel on the first part of the second shaft and meshing with the intermediate pinion, a pinion on the driven shaft and meshing with the intermediate gear wheel, a third shaft supported for rotation on the casing and under the control of an operator, and an eccentric on the third shaft, the eccentric engaging the power-transmitting wheel, to move the second part of the second shaft longitudinally, thereby to disengage the driven pinion from the intermediate gear wheel.

4. A device of the class described constructed as set forth in claim 1 and further characterized by the fact that the pinion of the driven shaft is slidable on the driven shaft, into and out of mesh with the intermediate gear wheel, and means for sliding the pinion of the driven shaft into and out of mesh with the intermediate gear wheel.

5. A device of the class described, constructed as set forth in claim 1, and further characterized by the fact that the pinion of the driven shaft is slidable thereon, into and out of mesh with the intermediate gear wheel, the means for sliding the pinion on the driven shaft comprising a tool-actuating shaft having means for holding a tool and having a detachable coupling for engagement with the driven shaft, the coupling engaging the pinion on the driven shaft, to move that pinion out of engagement with the intermediate gear wheel.

CHARLES EDWARD PHILLIPS.